United States Patent
Chou et al.

(10) Patent No.: US 10,489,328 B2
(45) Date of Patent: Nov. 26, 2019

(54) UNIVERSAL SLEDS SERVER ARCHITECTURE

(71) Applicant: Quanta Computer Inc., Taoyuan (TW)

(72) Inventors: Le-Sheng Chou, Taoyuan (TW); Sz-Chin Shih, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 628 days.

(21) Appl. No.: 14/865,955

(22) Filed: Sep. 25, 2015

(65) Prior Publication Data

US 2017/0091133 A1    Mar. 30, 2017

(51) Int. Cl.
G06F 13/40 (2006.01)
G06F 13/42 (2006.01)
G06F 13/38 (2006.01)

(52) U.S. Cl.
CPC ........ *G06F 13/4022* (2013.01); *G06F 13/385* (2013.01); *G06F 13/4282* (2013.01)

(58) Field of Classification Search
None
See application file for complete search history.

(56) References Cited

U.S. PATENT DOCUMENTS

| | | | |
|---|---|---|---|
| 2008/0307607 A1 | 12/2008 | Kim et al. | |
| 2012/0109896 A1* | 5/2012 | Abraham | G06F 17/30575 707/659 |
| 2012/0167101 A1* | 6/2012 | Kandula | H04L 67/325 718/102 |
| 2013/0268709 A1* | 10/2013 | Brundridge | G06F 13/4081 710/304 |
| 2014/0052309 A1* | 2/2014 | Chandrasekhar | G06F 1/26 700/297 |
| 2014/0149658 A1* | 5/2014 | Boyd | G06F 3/0607 711/112 |
| 2014/0215458 A1* | 7/2014 | Devarapalli | G06F 9/455 718/1 |

FOREIGN PATENT DOCUMENTS

| TW | 377897 I | 11/2012 |
|---|---|---|
| TW | 201421197 A | 6/2014 |

OTHER PUBLICATIONS

Taiwanese Search Report 104136613 dated Oct. 31, 2016 w/ English First Office Action Summary.

* cited by examiner

*Primary Examiner* — Tim T Vo
*Assistant Examiner* — Herve Iradukunda
(74) *Attorney, Agent, or Firm* — Nixon Peabody LLP; Zhou Lu

(57) ABSTRACT

A system for sharing input/output using universal sleds includes a first universal sled that includes a first switch and a first universal node, and a second universal sled that includes a second switch and a second universal node, where the first universal sled and second universal sled have interchangeable physical dimensions. The midplane board includes a management processor and a midplane switch. The system further includes an input/output sled and a bus that connects the first universal sled, the second universal sled, the midplane board, and the input/output sled.

20 Claims, 8 Drawing Sheets

600

610

COMMUNICATING INPUT/OUTPUT BETWEEN A FIRST UNIVERSAL SLED AND A MIDPLANE BOARD USING A BUS, WHEREIN THE FIRST UNIVERSAL SLED COMPRISES A FIRST SWITCH AND A FIRST UNIVERSAL NODE

620

COMMUNICATING INPUT/OUTPUT BETWEEN A SECOND UNIVERSAL SLED AND THE MIDPLANE BOARD USING THE BUS, WHEREIN THE FIRST UNIVERSAL SLED AND SECOND UNIVERSAL SLED HAVE INTERCHANGEABLE PHYSICAL DIMENSIONS

630

COMMUNICATING INPUT/OUTPUT BETWEEN THE MIDPLANE BOARD AND A INPUT/OUTPUT SLED, WHEREIN THE MIDPLANE BOARD COMPRISES A MANAGEMENT PROCESSOR AND A MIDPLANE SWITCH

FIG. 6

UNIVERSAL SLEDS SERVER ARCHITECTURE

FIELD

This application relates to managed computer systems, and more particularly to a system and method for sharing input/output using universal sleds.

BACKGROUND

Computer server systems in modern data centers are commonly mounted in specific configurations on server racks for which a number of computing modules, such as server trays, server chassis, server sleds, server blades, etc., are positioned and stacked relative on top of each other within the server racks. Rack mounted systems allow for vertical arrangement of the computing modules to use space efficiently. Generally, each computing module can be slid into and out of the server rack (i.e., a sled), and various cables such as input/output cables, network cables, power cables, etc., can connect to the computing modules at the front or rear of the rack. Each computing module can contain one or more computer servers or may hold one or more computer server components. For example computing modules can include hardware circuitry for processing, storage, network controllers, disk drives, cable ports, power supplies, etc. Each computing module may require an individual corresponding input/output interface for communicating with a network, other computing modules, or various computer server components.

Each computing module can be connected to a network such as an Ethernet network. Ethernet has been the most widely used networking standard for connecting computers in both Local Area Networks (LANs) and Wide Area Networks (WANs). Ethernet devices can communicate by transmitting data packets, which comprise blocks of data that are individually sent and delivered. Ethernet defines a number of wiring and signaling standards using a common addressing format.

SUMMARY

The following presents a simplified summary of one or more embodiments in order to provide a basic understanding of present technology. This summary is not an extensive overview of all contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later.

In some implementations, a system for sharing input/output using universal sleds includes a first universal sled that includes a first switch and a first universal node, and a second universal sled that includes a second switch and a second universal node, where the first universal sled and second universal sled have interchangeable physical dimensions. The midplane board includes a management processor and a midplane switch. The system further includes an input/output sled and a bus that connects the first universal sled, the second universal sled, the midplane board, and the input/output sled.

In some implementations, a method is provided for sharing input/output using universal sleds that includes communicating input/output between a first universal sled and a midplane board using a bus, where the first universal sled includes a first switch and a first universal node. The method includes communicating input/output between a second universal sled and the midplane board using the bus, where the first universal sled and second universal sled have interchangeable physical dimensions. The method further includes communicating input/output between the midplane board and an input/output sled, where the midplane board comprises a management processor and a midplane switch.

In some implementations, a method is provided for sharing input/output using universal sleds that includes connecting a first universal sled that includes a first switch and a first universal node to a bus. The method includes connecting a second universal sled that includes a second switch and a second universal node to the bus. In one aspect, the first universal sled and second universal sled have interchangeable physical dimensions. The method further includes connecting a midplane board, including a management processor and a midplane switch, to the bus, and connecting an input/output sled to the midplane board.

BRIEF DESCRIPTION OF THE DRAWINGS

These and other sample aspects of the present technology will be described in the detailed description and the appended claims that follow, and in the accompanying drawings, wherein:

FIG. 6 illustrates an example methodology for sharing input/output using universal sleds;

DETAILED DESCRIPTION

The subject disclosure provides techniques for automatically installing system software to a server on boot. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects.

An administrator of a data center may wish to install a new operation system or other system software to one or more servers in the data center. For example, installing a new OS is common when adding a new server to the data center, when a server receives significant hardware changes, or when a new OS is released. The installation of OS to servers often requires significant time and resources. Traditionally, to install an OS or other system software to a server requires multiple boot ups of the server.

Figure 1:
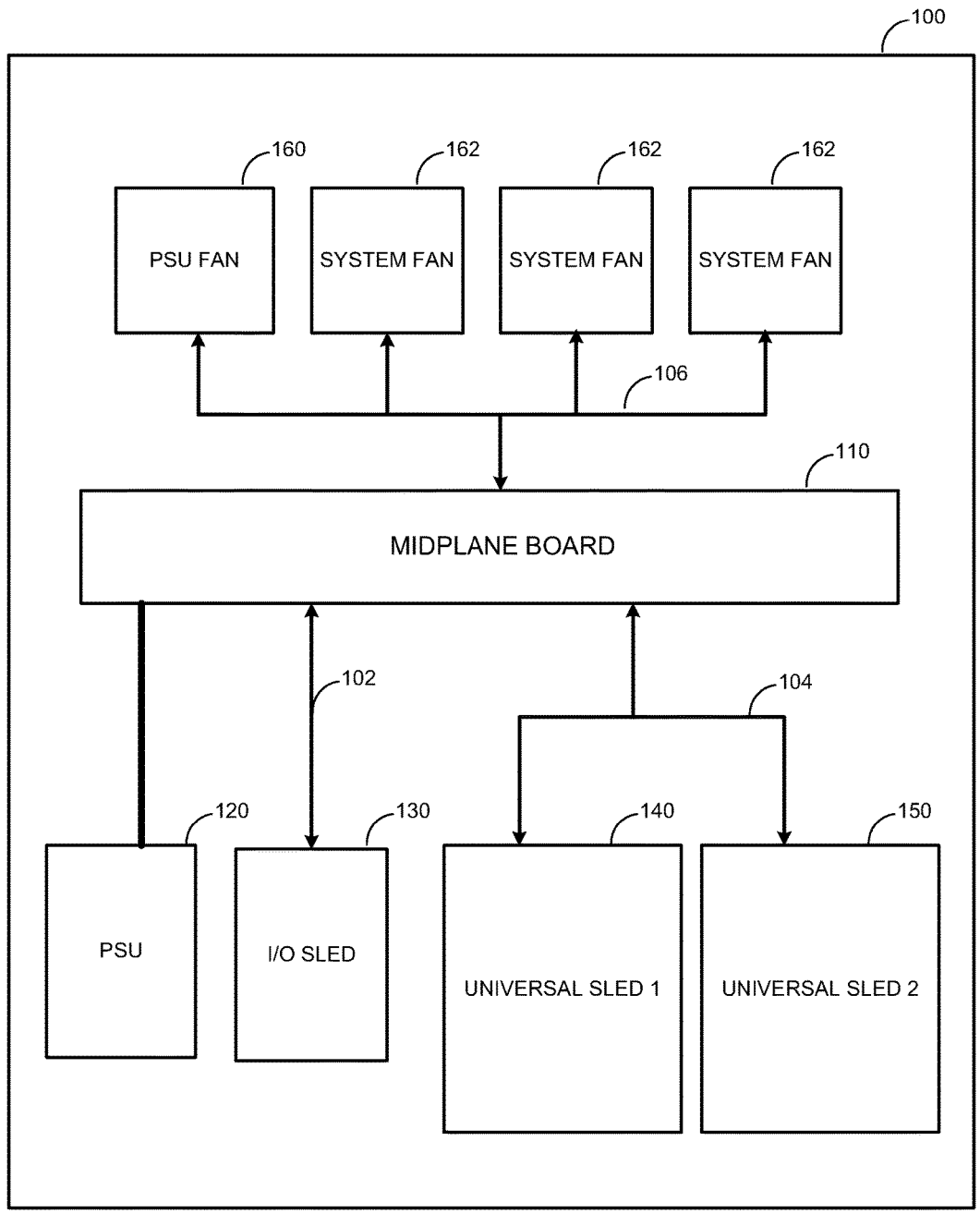
FIG. 1 illustrates an example server system for sharing input/output using universal sleds.

FIG. 1 illustrates an example server system 100 for sharing input/output using universal sleds. The server system 100 includes a midplane board 110, a power supply unit (PSU) 120, an input/output (I/O) sled 130, and multiple universal sleds 140, 150. Components of the server system 100 can be mounted inside a single enclosure (e.g., a chassis, self, tray, rack, etc.) or can be mounted inside multiple enclosures. The server system 100 allows multiple universal sleds 140, 150 to share I/O features provided by the I/O sled.

The midplane board 110 connects the I/O sled 130 to the universal sleds 140, 150. The midplane board 110 also provides power to the I/O sled 130 and the universal sleds 140, 150 from the PSU 120. The PSU 120 functions to convert mains alternating current (AC) to low-voltage regulated direct current (DC) power for the internal components of the server system 100.

The universal sleds 140, 150 can connect to the midplane board 110 using a communication bus 104 such as Peripheral Component Interconnect (PCI) bus, PCI eXtended (PCI-X) bus, PCI Express (PCIe) bus, etc. The I/O sled 130 can also use a communication bus 102 to connect to the midplane board 110. Although not shown, it is understood that the server system 100 can include additional universal sleds that function in a similar matter to the universal sleds 140, 150.

PCI uses a shared parallel bus architecture, in which the PCI host and all devices share a common set of address, data and control lines. In contrast, PCIe uses point-to-point topology, with separate serial links connecting every device to a host. In terms of bus protocol, PCIe communication is encapsulated in packets.

In some optional implementations, the midplane board 110 can connect to one or more PSU fans 160 and/or system fans 162. The midplane board 110 can manage fan speeds of each of the fans. In some implementations, the midplane board 110 determines temperature information for the server system 100 using temperature sensors and adjusts the fan speeds of each of the fans based on temperature. In some other implementations, the midplane board 110 determines a power use from the PSU 120 and adjusts the fan speeds of each of the fans based on the power use. For example, the midplane board 110 can increase the fan speeds for higher temperatures or power use.

In some implementations, the universal sled 1 140 and the universal sled 2 150 can be installed or removed by sliding in or out of the server system 100 on a tray. In some implementations, the universal sled 1 140 and the universal sled 2 150 are hot-swappable. Hot swappable devices can be installed or removed in a computer system without shutting down the computer system. Hot swapping describes replacing components without significant interruption to the computer system.

In some implementations, the universal sled 1 140 and the universal sled 2 150 have interchangeable physical dimensions. That is, the physical dimensions of the universal sled 1 140 and the physical dimensions of the universal sled 2 150 are similar enough to allow universal sled 1 140 to fit in a location previously used for universal sled 2 150 and vice versa.

In some implementations, the universal sled 1 140 and the universal sled 2 150 have equivalent communication ports at equivalent locations. This allows connectors leading to the universal sled 1 140 and the universal sled 2 150 to function the same if the universal sleds 140, 150 are swapped. For example, both universal sleds 140, 150 can have a PCIe port in a middle of a back panel.

In some implementations, the I/O sled 130 includes various input/output devices and/or ports to allow the server system 100 to communicate with other devices outside of the server system 100 or with a network. For example, the input/output ports can include Universal Serial Bus (USB), display, audio, serial, parallel, Serial Advanced Technology Attachment (SATA) ports, Ethernet, Firewire, Fibre Channel, etc.

In some implementations, the I/O sled 130 can be installed or removed by sliding in or out of the server system 100 on a tray. In some implementations, the I/O sled 130 is hot-swappable. In some implementations, the I/O sled 130 is connected to a top-of-rack.

Figure 2:
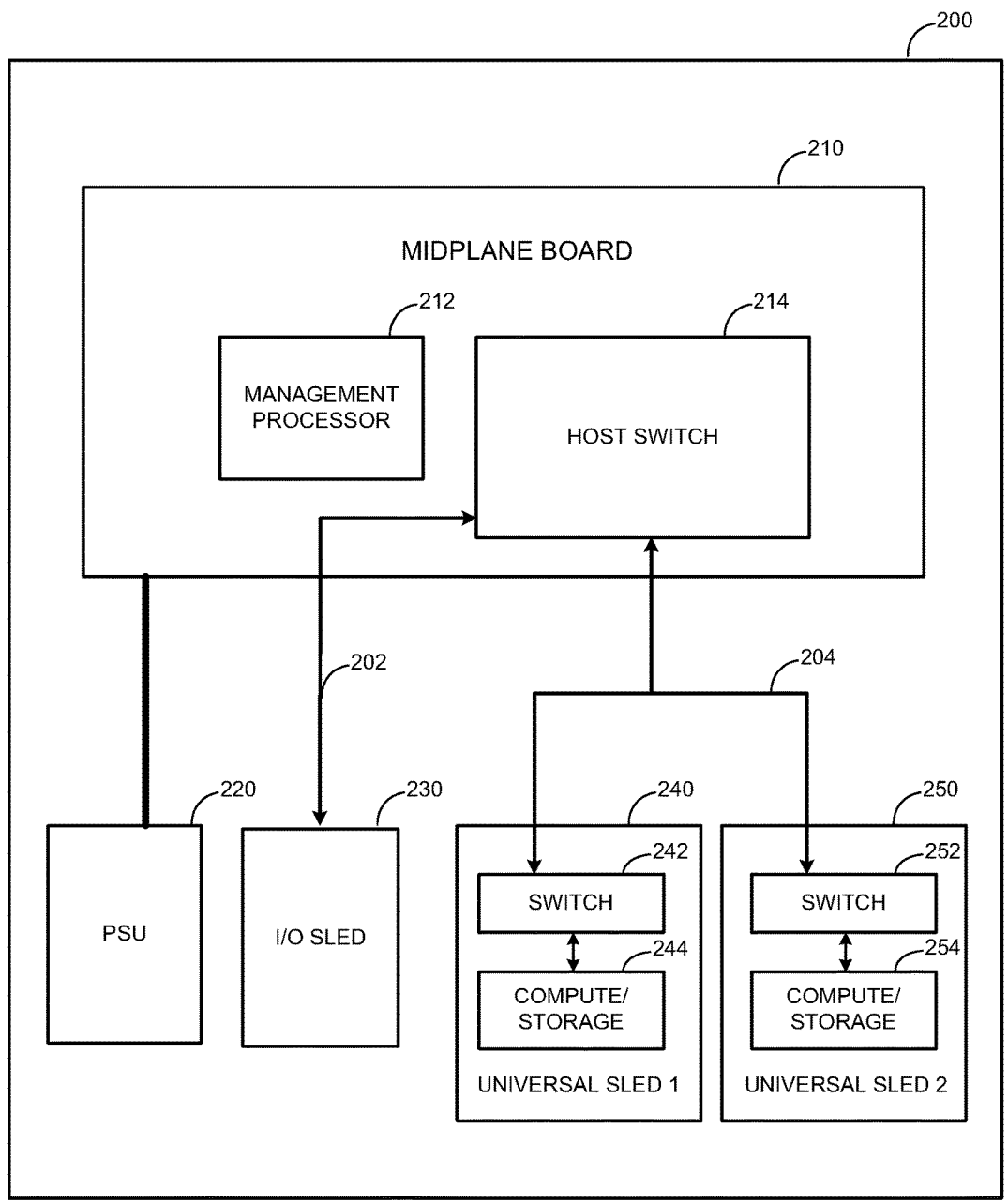
FIG. 2 illustrates another example server system for sharing input/output using universal sleds.

FIG. 2 illustrates another example server system 200 for sharing input/output using universal sleds. The server system 200 includes a midplane board 210, a power supply unit (PSU) 220, an input/output (I/O) sled 230, and multiple universal sleds 240, 250. Components of the server system 200 can be mounted inside a single enclosure (e.g., a chassis, self, tray, rack, etc.) or can be mounted inside multiple enclosures. The server system 200 allows multiple universal sleds 240, 250 to share I/O features provided by the I/O sled.

The midplane board 210 connects the I/O sled 230 to the universal sleds 240, 250. The midplane board 210 also provides power to the I/O sled 230 and the universal sleds 240, 250 from the PSU 220. The PSU 220 functions to convert mains alternating current (AC) to low-voltage regulated direct current (DC) power for the internal components of the server system 200.

In some implementations, the midplane board 210 includes a processor 212 (e.g., a central processing unit or a management processor) and a host switch 214. For example, the host switch 214 can be a PCIe host switch for interfacing with PCIe bus 202, 204. In some implementations, the processor 212 initializes the host switch for routing, sharing, and/or virtualization. The host switch 214 connects to each of the universal sleds 240, 250 and the I/O sled 230.

A network switch (e.g., an Ethernet or PCIe switch) can be a device used on a computer network to physically connect devices together. Multiple cables can be connected to a switch to enable networked devices to communicate with each other. Switches can manage the flow of data across a network by only transmitting a received message to the device for which the message was intended. Each networked device connected to a switch can be identified using a media access control (MAC) address, allowing the switch to regulate the flow of traffic. Switches can include application specific integrated circuits (ASICs) to build and maintain MAC address tables.

The universal sleds 240, 250 can connect to the midplane board 210 using a communication bus 204 such as Peripheral Component Interconnect (PCI) bus, PCI eXtended (PCI-X) bus, PCI Express bus (PCIe), etc. The I/O sled 230 can also use a communication bus 202 to connect to the midplane board 210. Although not shown, it is understood that the server system 200 can include additional universal sleds that function in a similar matter to the universal sleds 240, 250.

In some implementations, the universal sleds 240, 250 can each include a switch 242, 252 and a compute node, a storage node, or other such node. For example, the switches 242, 252 can be PCIe switches for connecting to the PCIe bus 204. The universal sled 240, 250 can accommodate a compute node or a storage node. A compute node can include a processor and/or memory and provide the server system 200 with processing capabilities. For example, the processor can be a system on chip (SoC) or a central processing unit (CPU). A storage node can include one or more hard disk drives (HDDs), solid state drives (SSDs), and/or other storage devices and provide the server system 200 with data storage capability.

In some implementations, the universal sled 1 240 and the universal sled 2 250 can be installed or removed by sliding in or out of the server system 200 on a tray. In some implementations, the universal sled 1 240 and the universal sled 2 250 are hot-swappable.

In some implementations, the universal sled 1 240 and the universal sled 2 250 have interchangeable physical dimensions. That is, the physical dimensions of the universal sled 1 240 and the physical dimensions of the universal sled 2 250 are similar enough to allow universal sled 1 240 to fit in a location previously used for universal sled 2 250 and vice versa.

In some implementations, the universal sled 2 240 and the universal sled 2 250 have equivalent communication ports at equivalent locations. This allows connectors leading to the universal sled 2 240 and the universal sled 2 250 to function the same if the universal sleds 240, 250 are swapped. For example, both universal sleds 240, 250 can have a PCIe port in a middle of a back panel.

In some implementations, the I/O sled 230 includes various input/output devices and/or ports to allow the server system 200 to communicate with other devices outside of the server system 200 or with a network. For example, the input/output ports can include Universal Serial Bus (USB), display, audio, serial, parallel, Serial Advanced Technology Attachment (SATA) ports, Ethernet, Firewire, Fibre Channel, etc.

In some implementations, the I/O sled 230 can be installed or removed by sliding in or out of the server system 200 on a tray. In some implementations, the I/O sled 230 is hot-swappable. In some implementations, the I/O sled 230 is connected to a top-of-rack.

Figure 3:
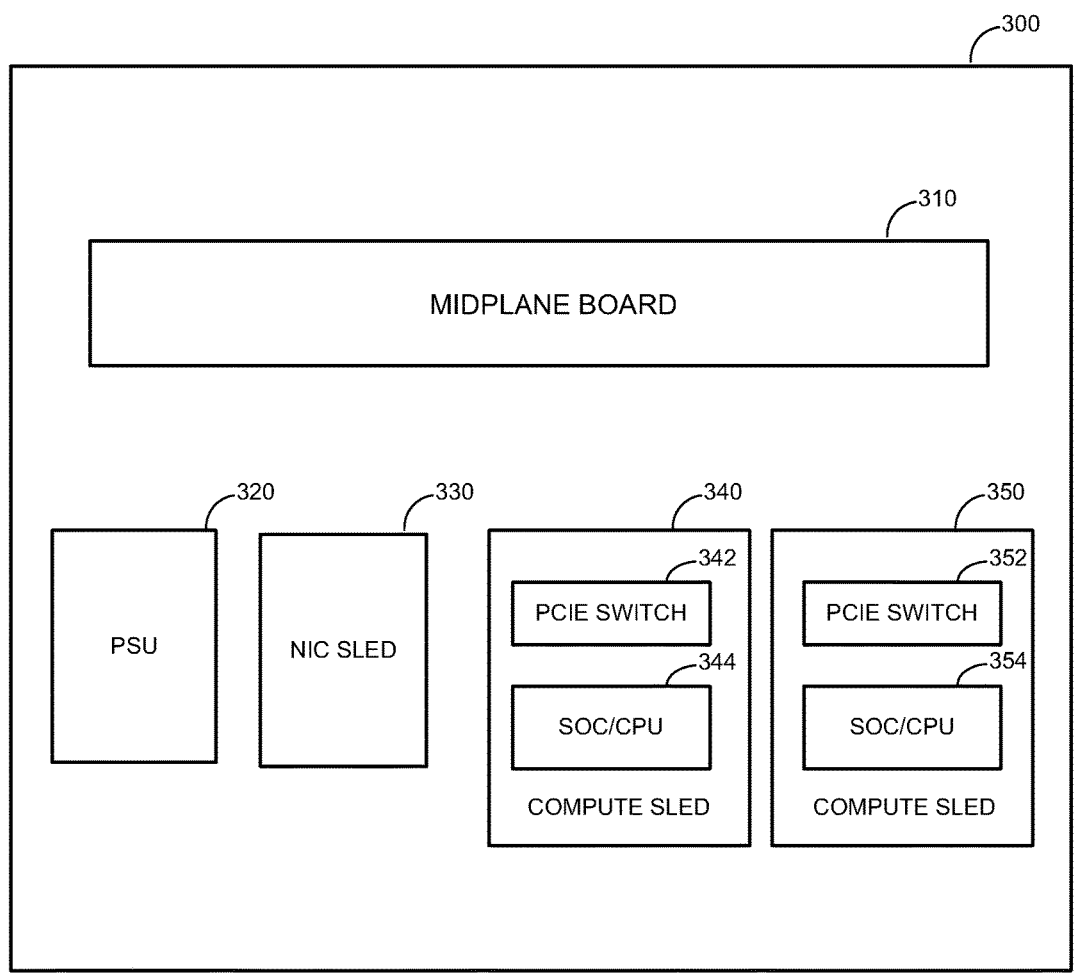
FIG. 3 illustrates an example server system including only compute sleds.

FIG. 3 illustrates an example server system 300 including only compute sleds. The server system 300 is a second variation of the server system 200 of FIG. 2. The server system 300 includes a midplane board 310, a power supply unit (PSU) 320, a NIC sled 330, and multiple compute sleds 340, 350. The server system 300 allows multiple compute sleds 340, 350 to share I/O features provided by the NIC sled 330.

The NIC sled 330 can include a network interface controller (NIC) (e.g., an Ethernet controller) that provides the server system 300 with connection to a network. For example the network can be any wired or wireless LANs or WANs, such as Ethernet, Fibre Channel, Wi-Fi, Bluetooth, Firewire, the Internet, etc.

The midplane board 310 connects the NIC sled 330 to the compute sleds 340, 350. The midplane board 310 also provides power to the NIC sled 330 and the compute sleds 340, 350 from the PSU 320. The PSU 320 functions to convert mains alternating current (AC) to low-voltage regulated direct current (DC) power for the internal components of the server system 300.

In some implementations, the compute sleds 340, 350 can each include a switch 342, 352 and a compute node. For example, the switches 342, 352 can be PCIe switches for connecting to a PCIe bus. Each compute node 344, 354 can include a processor and/or memory and provide the server system 300 with processing capabilities. For example, the processor can be a system on chip (SoC) or a central processing unit (CPU).

Figure 4:
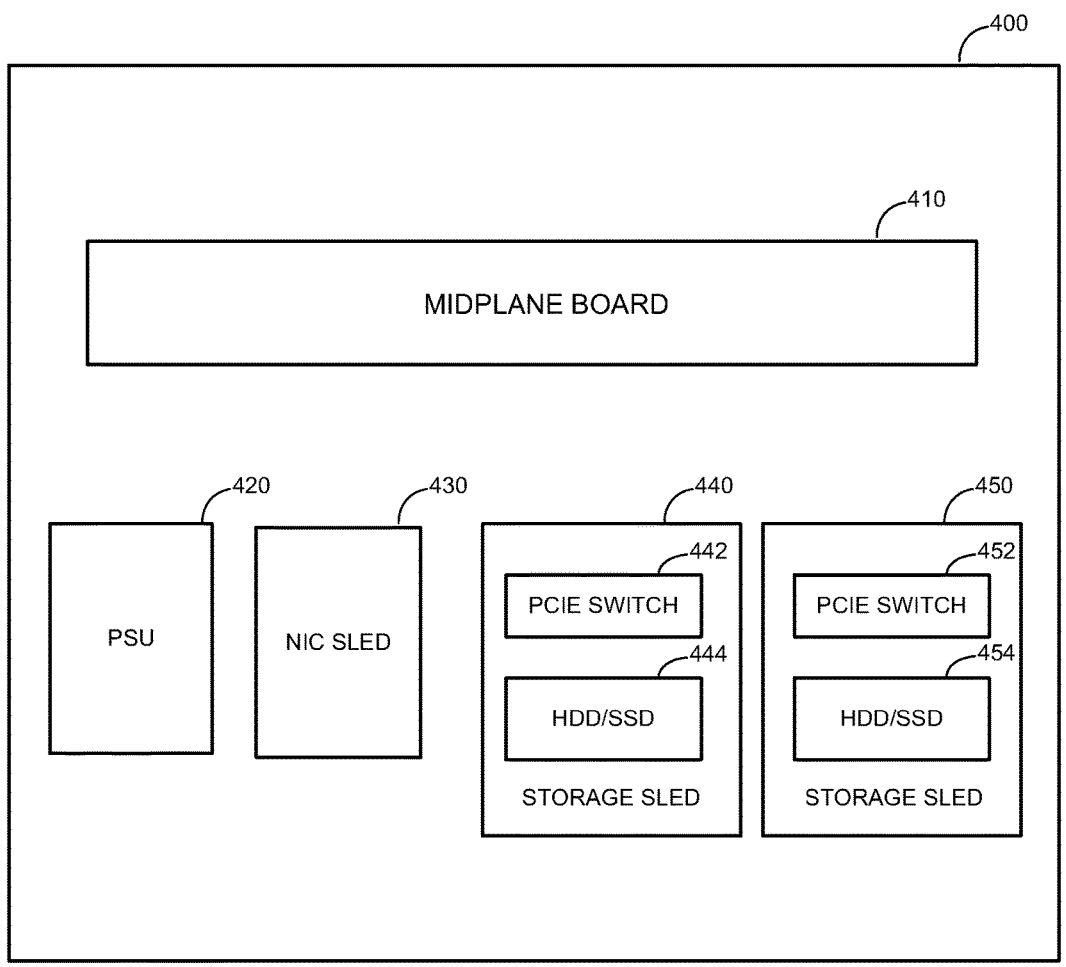
FIG. 4 illustrates an example server system including only storage sleds.

FIG. 4 illustrates an example server system including only storage sleds. The server system 400 is a variation of the server system 200 of FIG. 2. The server system 400 includes a midplane board 410, a power supply unit (PSU) 420, a NIC sled 430, and multiple storage sleds 440, 450. The server system 400 allows multiple storage sleds 440, 450 to share I/O features provided by the NIC sled 430.

The NIC sled 430 can include a network interface controller (NIC) (e.g., an Ethernet controller) that provides the server system 400 with connection to a network. For example the network can be any wired or wireless LANs or WANs, such as Ethernet, Fibre Channel, Wi-Fi, Bluetooth, Firewire, the Internet, etc.

The midplane board 410 connects the NIC sled 430 to the storage sleds 440, 450. The midplane board 410 also provides power to the NIC sled 430 and the storage sleds 440, 450 from the PSU 420. The PSU 420 functions to convert mains alternating current (AC) to low-voltage regulated direct current (DC) power for the internal components of the server system 400.

In some implementations, the compute sleds 440, 450 can each include a switch 442, 452 and a storage node. For example, the switches 442, 452 can be PCIe switches for connecting to a PCIe bus. Each storage node 444, 454 can include one or more hard disk drives (HDDs), solid state drives (SSDs), and/or other storage devices and provide the server system 400 with data storage capability.

Figure 5:
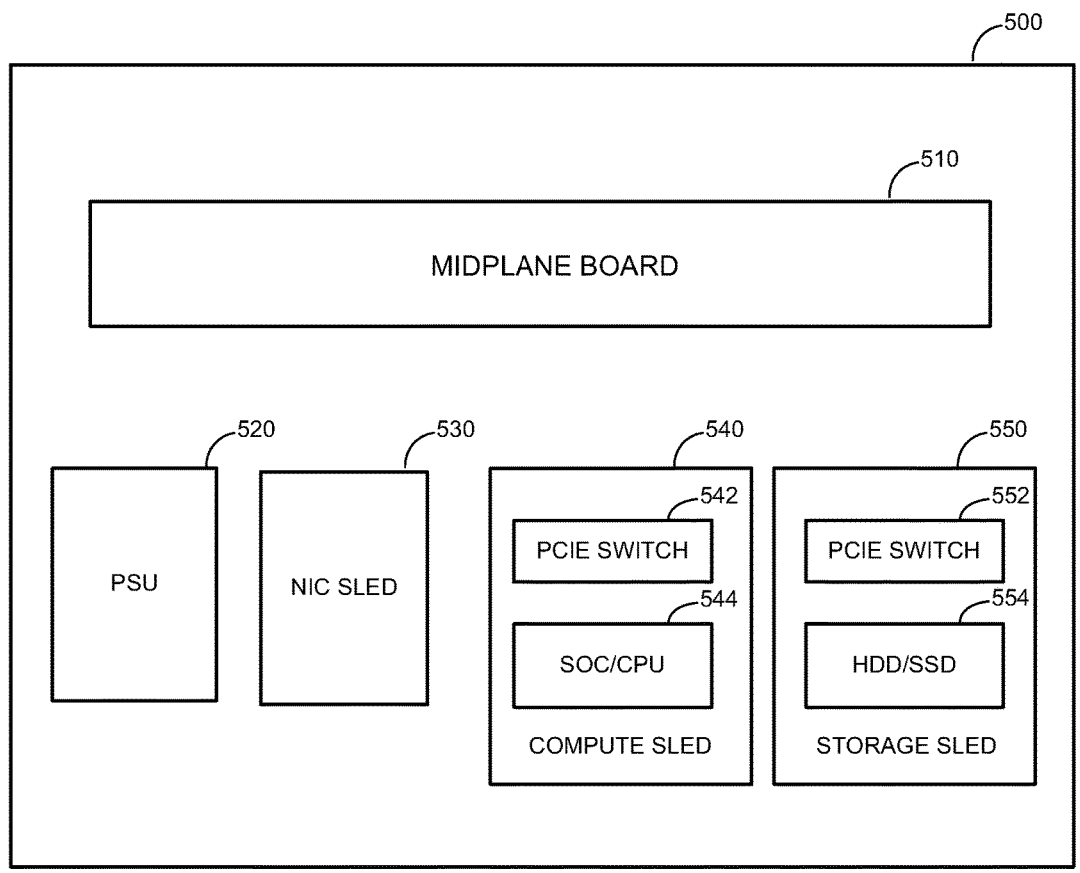
FIG. 5 illustrates an example server system including a compute sled and a storage sled.

FIG. 5 illustrates an example server system including a compute sled and a storage sled. The server system 500 is a third variation of the server system 200 of FIG. 2. The server system 500 includes a midplane board 510, a power supply unit (PSU) 520, a NIC sled 530, a compute sled 540, and a storage sled 550. The server system 500 allows the compute sled 540 and the storage sled 550 to share I/O features provided by the NIC sled 530.

The NIC sled 530 can include a network interface controller (NIC) (e.g., an Ethernet controller) that provides the server system 500 with connection to a network. For example the network can be any wired or wireless LANs or WANs, such as Ethernet, Fibre Channel, Wi-Fi, Bluetooth, Firewire, the Internet, etc.

The midplane board 510 connects the NIC sled 530 to the compute sled 540 and the storage sled 550. The midplane board 510 also provides power to the NIC sled 530 and the storage sleds 540, 550 from the PSU 520. The PSU 520 functions to convert mains alternating current (AC) to low-voltage regulated direct current (DC) power for the internal components of the server system 500.

In some implementations, the compute sled 540 and the storage sled 550 can each include a switch 542, 552. For example, the switches 542, 552 can be PCIe switches for connecting to a PCIe bus. The compute sled 540 includes a compute node 544, 554 that includes a processor and/or memory. The storage sled 550 includes a storage node 554 that includes one or more hard disk drives (HDDs), solid state drives (SSDs), and/or other storage devices.

FIG. 6 illustrates an example methodology 600 for sharing input/output using universal sleds. The method 600 involves, at step 610, communicating input/output between a first universal sled and a midplane board using a bus, where the first universal sled includes a first switch and a first universal node.

In some aspects, the bus is a peripheral component interconnect express bus. In some aspects, the first universal node is a storage node including a solid state drive. In some aspects, is a storage node including a hard disk drive. In some aspects, the first universal node is a compute node including a system on chip. In some other aspects, the first universal node is a compute node including a central processing unit.

The method 600 involves, at step 620, communicating input/output between a second universal sled and the midplane board using the bus, where the first universal sled and second universal sled have interchangeable physical dimensions.

In some aspects, first switch, the second switch, and the midplane switch are peripheral component interconnect express switches. In some aspects, the first universal sled and second universal sled have equivalent communication ports at equivalent locations.

The method 600 involves, at step 630, communicating input/output between the midplane board and a input/output sled, where the midplane board includes a management processor and a midplane switch. In some aspects, the midplane switch is a top-of-rack network switch that supports data virtualization. In some aspects, the management processor is configured to initialize the midplane switch for routing, sharing, and virtualization of input/output signals.

Figure 7:
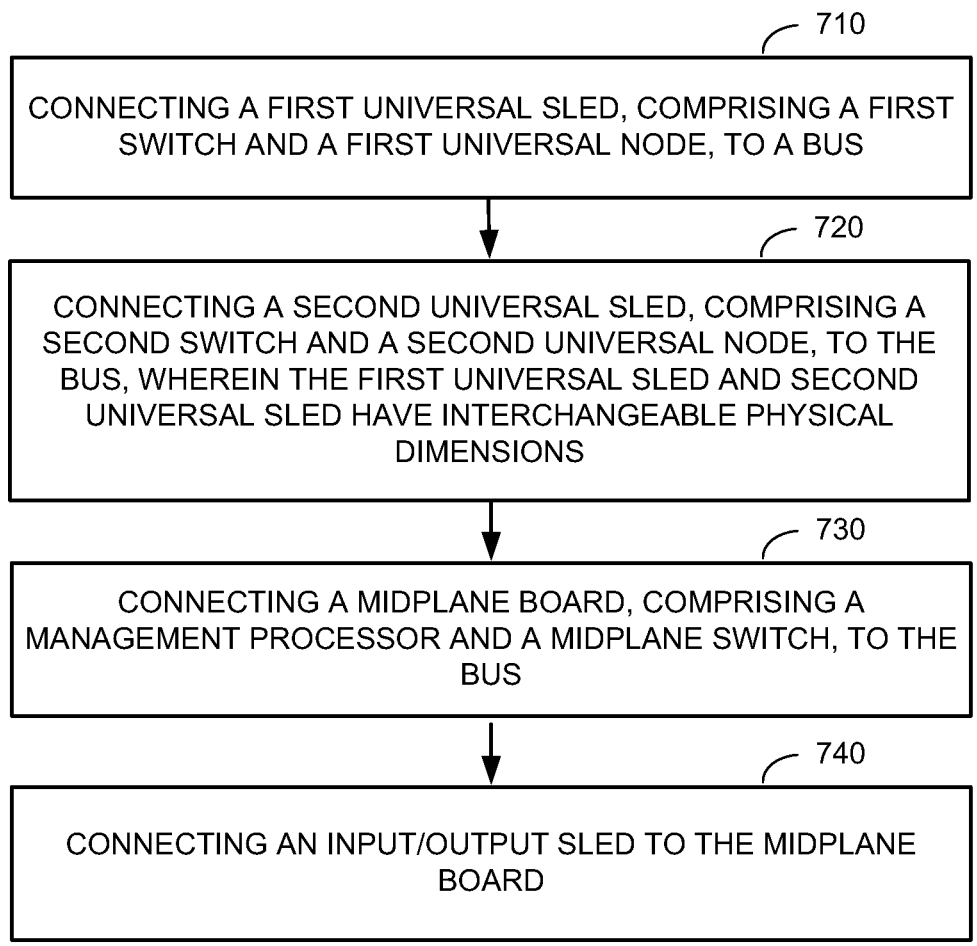
FIG. 7 illustrates another example methodology for sharing input/output using universal sleds.

FIG. 7 illustrates another example methodology 700 for sharing input/output using universal sleds. The method 700 involves, at step 710, connecting a first universal sled, including a first switch and a first universal node, to a bus.

The method 700 involves, at step 720, connecting a second universal sled, comprising a second switch and a second universal node, to the bus, wherein the first universal sled and second universal sled have interchangeable physical dimensions.

The method 700 involves, at step 730, connecting a midplane board, including a management processor and a midplane switch, to the bus.

The method 700 involves, at step 740 connecting an input/output sled to the midplane board.

The method 700 can further involve connecting a power supply unit to the midplane board. The method 700 can further involve connecting the midplane switch to at least one fan.

Figure 8:
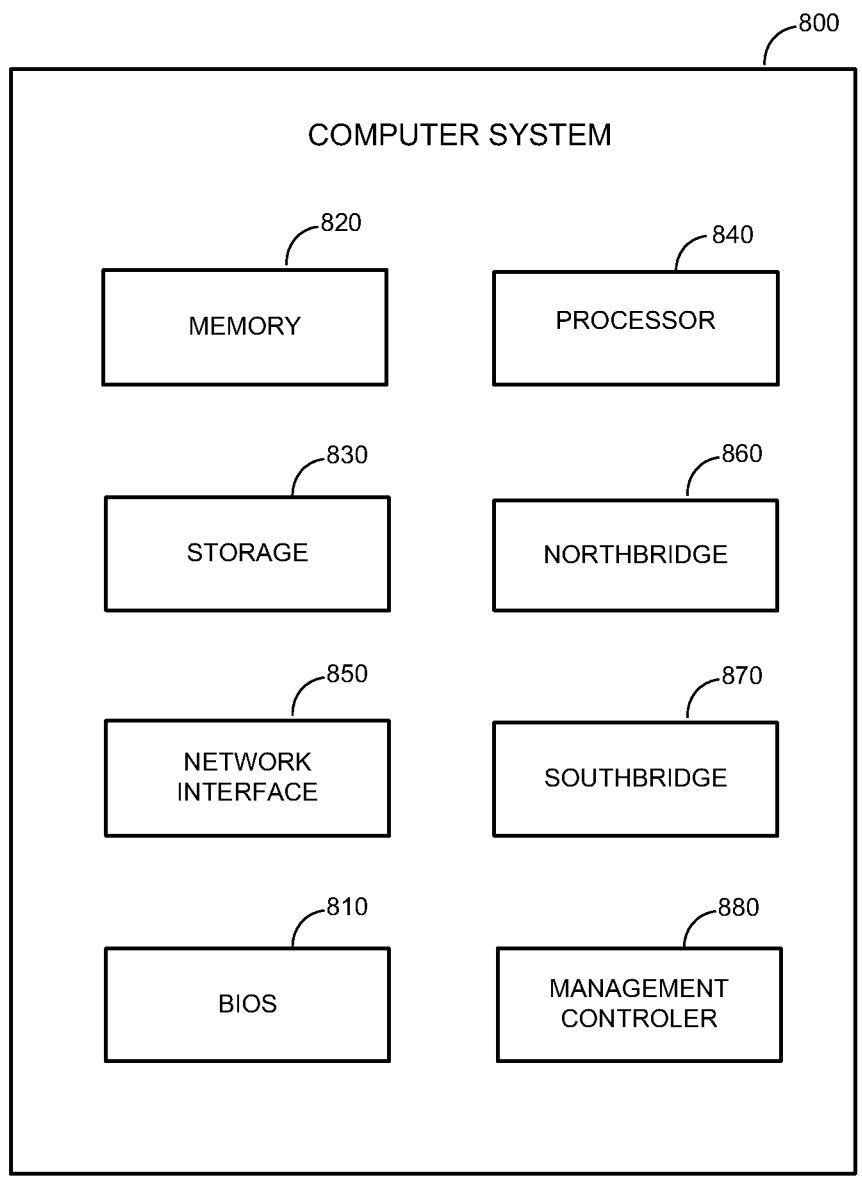
FIG. 8 illustrates a block diagram of an example computer system.

FIG. 8 illustrates a block diagram of an example computer system 800. The computer system 800 can include a processor 840, a network interface 850, a management controller 880, a memory 820, a storage 830, a BIOS 810, a northbridge 860, and a southbridge 870. In some instances, the northbridge 860 and the southbridge 870 can be combined into a single die, such as for example into a platform controller hub (PCH).

The computer system 800 can be, for example, a server (e.g., a server in a server rack of a data center) or a personal computer. The processor (e.g., central processing unit (CPU)) 840 can be a chip on a motherboard that can retrieve and execute programming instructions stored in the memory 820. The processor 840 can be a single CPU with a single processing core, a single CPU with multiple processing cores, or multiple CPUs. One or more buses (not shown) can transmit instructions and application data between various computer components such as the processor 840, memory 820, storage 830, and networking interface 850.

The memory 820 can include any physical device used to temporarily or permanently store data or programs, such as various forms of random-access memory (RAM). The storage 830 can include any physical device for non-volatile data storage such as a HDD or a flash drive. The storage 830 can have a greater capacity than the memory 820 and can be more economical per unit of storage, but can also have slower transfer rates.

The BIOS 810 can include a Basic Input/Output System or its successors or equivalents, such as an Extensible Firmware Interface (EFI) or Unified Extensible Firmware Interface (UEFI). The BIOS 810 can include a BIOS chip located on a motherboard of the computer system 800 storing a BIOS software program. The BIOS 810 can store firmware executed when the computer system is first powered on along with a set of configurations specified for the BIOS 810. The BIOS firmware and BIOS configurations can be stored in a non-volatile memory (e.g., NVRAM) or a ROM such as flash memory. Flash memory is a non-volatile computer storage medium that can be electronically erased and reprogrammed.

The BIOS 810 can be loaded and executed as a sequence program each time the computer system 800 is started. The BIOS 810 can recognize, initialize, and test hardware present in a given computing system based on the set of configurations. The BIOS 810 can perform self-test, such as a Power-on-Self-Test (POST), on the computer system 800. This self-test can test functionality of various hardware components such as hard disk drives, optical reading devices, cooling devices, memory modules, expansion cards and the like. The BIOS can address and allocate an area in the memory 820 in to store an OS. The BIOS 810 can then give control of the computer system to the OS.

The BIOS 810 of the computer system 800 can include a BIOS configuration that defines how the BIOS 810 controls various hardware components in the computer system 800. The BIOS configuration can determine the order in which the various hardware components in the computer system 800 are started. The BIOS 810 can provide an interface (e.g., BIOS setup utility) that allows a variety of different parameters to be set, which can be different from parameters in a BIOS default configuration. For example, a user (e.g., an administrator) can use the BIOS 810 to specify clock and bus speeds, specify what peripherals are attached to the computer system, specify monitoring of health (e.g., fan speeds and CPU temperature limits), and specify a variety of other parameters that affect overall performance and power usage of the computer system.

The management controller 880 can be a specialized microcontroller embedded on the motherboard of the computer system. For example, the management controller 880 can be a baseboard management controller (BMC). The management controller 880 can manage the interface between system management software and platform hardware. Different types of sensors built into the computer system can report to the management controller 880 on parameters such as temperature, cooling fan speeds, power status, OS status, etc. The management controller 880 can monitor the sensors and have the ability to send alerts to an administrator via the network interface 850 if any of the parameters do not stay within preset limits, indicating a potential failure of the system. The administrator can also remotely communicate with the management controller 880 to take some corrective action such as resetting or power cycling the system to restore functionality.

In some instances, the northbridge 860 and the southbridge 870 can be combined into a single die, such as for example into a PCH. The northbridge 860 can be a chip on the motherboard that can be directly connected to the processor 840 or can be integrated into the processor 840. The northbridge 860 and the southbridge 870, manage communications between the processor 840 and other parts of the motherboard. The northbridge 860 can manage tasks that require higher performance than the southbridge 870. The northbridge 860 can manage communications between the processor 840, the memory 820, and video controllers (not shown). In some instances, the northbridge 860 can include a video controller.

The southbridge 870 can be a chip on the motherboard connected to the northbridge 860, but unlike the northbridge 860, need not be directly connected to the processor 840. The southbridge 870 can manage input/output functions, such as Universal Serial Bus (USB), audio, serial, BIOS, Serial Advanced Technology Attachment (SATA), Peripheral Component Interconnect (PCI) bus, PCI eXtended (PCI-X) bus, PCI Express bus, ISA bus, SPI bus, eSPI bus, SMBus, of the computer system 800. The southbridge 870 can connect to or can include within the southbridge 870 the management controller 870, Direct Memory Access (DMAs) controllers, Programmable Interrupt Controllers (PICs), and a real-time clock. In some instances, the southbridge 870 can directly connect to the processor 840, such as in the case where the northbridge 860 is integrated into the processor 840.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

In one or more exemplary designs, the functions described can be implemented in hardware, software, firmware, or any combination thereof. If implemented in software, the functions can be stored on or transmitted over as one or more instructions or code on a non-transitory computer-readable medium. Non-transitory computer-readable media includes both computer storage media and communication media including any medium that facilitates transfer of a computer program from one place to another. A storage media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

The invention claimed is:

1. A system for sharing input/output by universal sleds, comprising:
    a first universal sled comprising a first switch and a first universal node;
    a second universal sled comprising a second switch and a second universal node, wherein the first universal sled and second universal sled have interchangeable physical dimensions;
    a midplane board comprising a management processor and a midplane switch;
    an input/output sled; and
    a bus, wherein the midplane switch is connected to the first universal sled via the bus, connected to the second universal sled via the bus, and connected to the input/output sled via the bus.

2. The system of claim 1, wherein the first universal sled and second universal sled have equivalent communication ports at equivalent locations.

3. The system of claim 1, wherein the midplane switch is a top-of-rack network switch that supports data virtualization.

4. The system of claim 1, wherein the management processor is configured to initialize the midplane switch for routing, sharing, and virtualization of input/output signals.

5. The system of claim 1, wherein the first switch, the second switch, and the midplane switch are peripheral component interconnect express switches.

6. The system of claim 1, wherein the bus is a peripheral component interconnect express bus.

7. The system of claim 1, wherein the first universal node is a compute node comprising a system on chip.

8. The system of claim 1, wherein the first universal node is a compute node comprising a central processing unit.

9. The system of claim 1, wherein the first universal node is a storage node comprising a solid state drive.

10. The system of claim 1, wherein the first universal node is a storage node comprising a hard disk drive.

11. The system of claim 1, further comprising a power supply unit connected to the midplane board.

12. The system of claim 1, wherein the midplane switch is connected to at least one fan.

13. A method for sharing input/output by universal sleds, comprising:
    communicating input/output between a first universal sled and a midplane board using a bus, wherein the first universal sled comprises a first switch and a first universal node;

communicating input/output between a second universal sled and the midplane board using the bus, wherein the first universal sled and second universal sled have interchangeable physical dimensions; and communicating input/output between the midplane board and a input/output sled, wherein the midplane board comprises a management processor and a midplane switch.

14. The method of claim 13, wherein the first universal sled and second universal sled have equivalent communication ports at equivalent locations.

15. The method of claim 13, wherein the bus is a peripheral component interconnect express bus.

16. The method of claim 13, wherein the first universal node is a compute node comprising a system on chip.

17. The method of claim 13, wherein the first universal node is a compute node comprising a central processing unit.

18. A method for sharing input/output by universal sleds, comprising:

connecting a first universal sled, comprising a first switch and a first universal node, to a bus;

connecting a second universal sled, comprising a second switch and a second universal node, to the bus, wherein the first universal sled and second universal sled have interchangeable physical dimensions;

connecting a midplane board, comprising a management processor and a midplane switch, to the bus; and connecting an input/output sled to the midplane board.

19. The method of claim 18, further comprising connecting a power supply unit to the midplane board.

20. The method of claim 18, further comprising connecting the midplane switch to at least one fan.

* * * * *